United States Patent [19]

Wall

[11] Patent Number: 5,796,088
[45] Date of Patent: Aug. 18, 1998

[54] HAND HELD PORTABLE BAR CODE DATAFORM READER HAVING A ROTATABLE READER MODULE PORTION

[75] Inventor: Daniel G. Wall, Uniontown, Ohio

[73] Assignee: Teletransactions, Inc., Akron, Ohio

[21] Appl. No.: 515,254

[22] Filed: Aug. 15, 1995

[51] Int. Cl.⁶ .............................. G06K 7/10; G06K 13/00
[52] U.S. Cl. ........................................... 235/472; 235/462
[58] Field of Search ................................. 235/472, 462

[56] References Cited

U.S. PATENT DOCUMENTS

| | | |
|---|---|---|
| D. 297,939 | 10/1988 | Bradbury et al. . |
| D. 303,663 | 9/1989 | Kumar et al. . |
| D. 309,295 | 7/1990 | de la Huerga et al. . |
| D. 334,922 | 4/1993 | Meyerson et al. . |
| D. 340,034 | 10/1993 | Hofstetter et al. . |
| 4,387,297 | 6/1983 | Swartz et al. . |
| 4,412,751 | 11/1983 | Jeannet et al. . |
| 4,460,120 | 7/1984 | Shepard et al. . |
| 4,593,186 | 6/1986 | Swartz et al. . |
| 4,621,189 | 11/1986 | Kumar et al. . |
| 4,660,221 | 4/1987 | Dlugos . |
| 4,748,318 | 5/1988 | Bearden et al. .............. 235/472 |
| 4,758,717 | 7/1988 | Shepard et al. . |
| 4,794,239 | 12/1988 | Allias . |
| 4,835,713 | 5/1989 | Pastor . |
| 4,850,009 | 7/1989 | Zook et al. .............. 379/96 |
| 4,889,982 | 12/1989 | Young et al. . |
| 4,916,441 | 4/1990 | Gombrich . |
| 4,983,818 | 1/1991 | Knowles .............. 235/472 |
| 5,015,831 | 5/1991 | Eastman et al. . |
| 5,043,854 | 8/1991 | Gammache . |
| 5,055,660 | 10/1991 | Bertagna et al. .............. 235/462 |
| 5,105,070 | 4/1992 | Wike, Jr. et al. .............. 235/472 |
| 5,113,445 | 5/1992 | Nang . |
| 5,123,064 | 6/1992 | Hacker et al. . |
| 5,130,520 | 7/1992 | Shepard et al. . |
| 5,142,161 | 8/1992 | Brackman .............. 235/472 |
| 5,144,120 | 9/1992 | Krichever et al. .............. 235/472 |
| 5,198,650 | 3/1993 | Wike, Jr. .............. 235/472 |
| 5,202,817 | 4/1993 | Koenck et al. . |
| 5,216,233 | 6/1993 | Main et al. .............. 235/472 |
| 5,227,614 | 7/1993 | Danielson et al. . |
| 5,227,617 | 7/1993 | Christopher et al. . |
| 5,237,161 | 8/1993 | Gradevant . |
| 5,243,655 | 9/1993 | Wang . |
| 5,304,786 | 4/1994 | Pavlidis . |
| 5,306,900 | 4/1994 | Metzitsky et al. .............. 235/472 |
| 5,324,925 | 6/1994 | Koenck et al. . |
| 5,331,136 | 7/1994 | Koenck et al. . |
| 5,337,361 | 8/1994 | Wang et al. . |
| 5,367,152 | 11/1994 | Krichever et al. .............. 235/472 |
| 5,369,262 | 11/1994 | Dvorkis et al. .............. 235/472 |
| 5,406,063 | 4/1995 | Jelen . |
| 5,471,042 | 11/1995 | Kirkeby et al. .............. 235/472 |
| 5,477,044 | 12/1995 | Aragon .............. 235/472 |
| 5,508,504 | 4/1996 | Dvorkis et al. .............. 235/472 |
| 5,530,619 | 6/1996 | Koenck et al. .............. 235/472 |
| 5,539,193 | 7/1996 | Gibbs et al. .............. 235/472 |
| 5,576,530 | 11/1996 | Hagerty .............. 235/472 |

OTHER PUBLICATIONS

Monicor Electronic Corp. brochure for Monicor Model IC-100 radio modem entitled "Monicor Snap-On Radio Modem for Mars Electronics MEQ™ Terminals," undated.
Article by Symbol Technologies, Inc. entitled, "A Primer for Two Dimensional Barcodes, Portable Data Files and POF417", Bonemia, NY, dated Oct. 1990.

*Primary Examiner*—Donald T. Hajec
*Assistant Examiner*—Douglas X. Rodriguez
*Attorney, Agent, or Firm*—Watts, Hoffmann, Fisher & Heinke Co., LPA

[57] ABSTRACT

A portable hand held bar code dataform reader is disclosed. The reader includes a main body portion configured to be held in an operator's hand and a bar code reader module portion rotatably secured to the main body portion. The bar code reader module portion is selectively rotated by the operator to facilitate reading bar code dataforms which are at varying orientations and heights with respect to the operator. An actuation switch is located on a surface facing the operator and is position to be actuated by the thumb of the hand holding the reader.

19 Claims, 5 Drawing Sheets

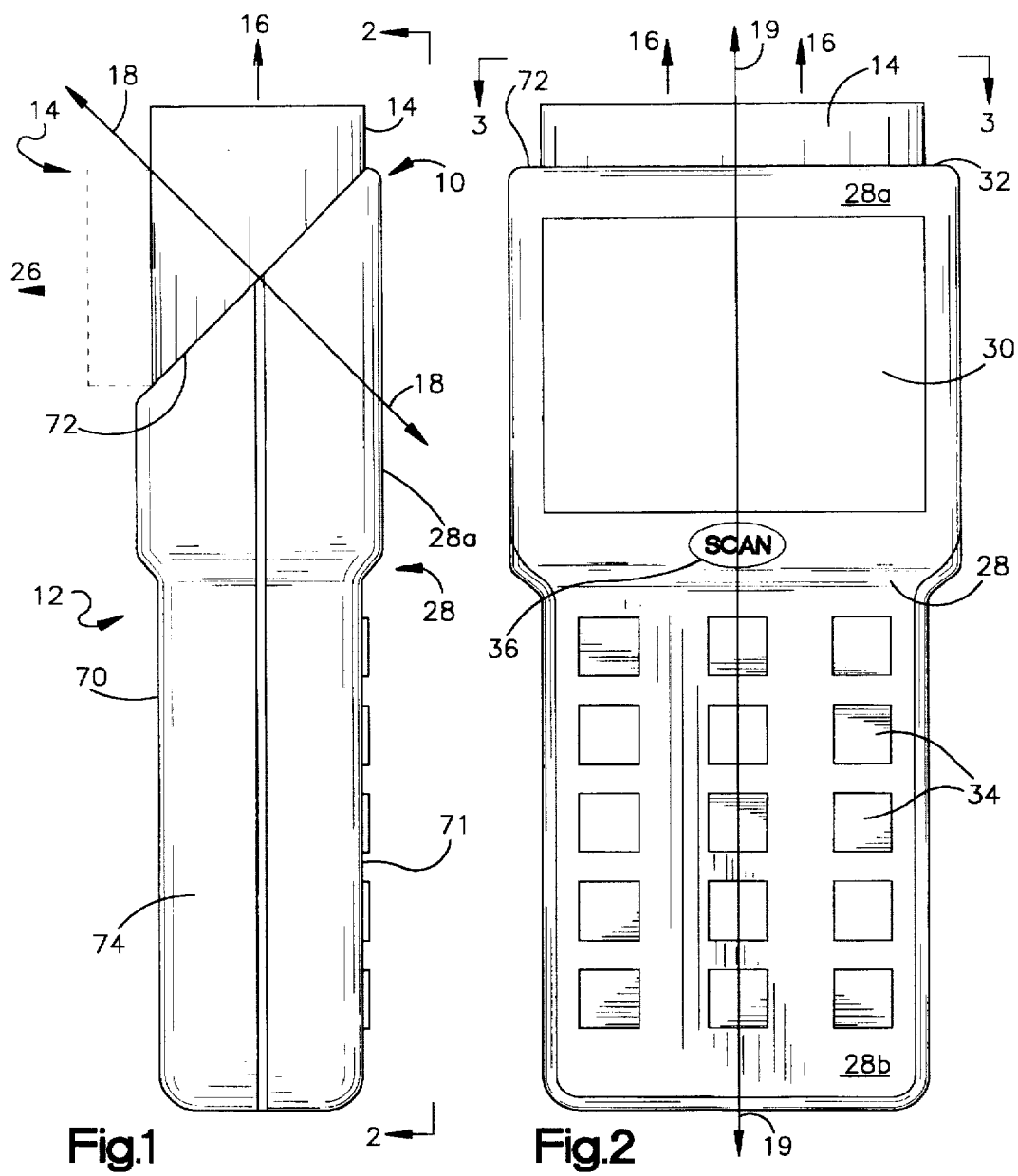

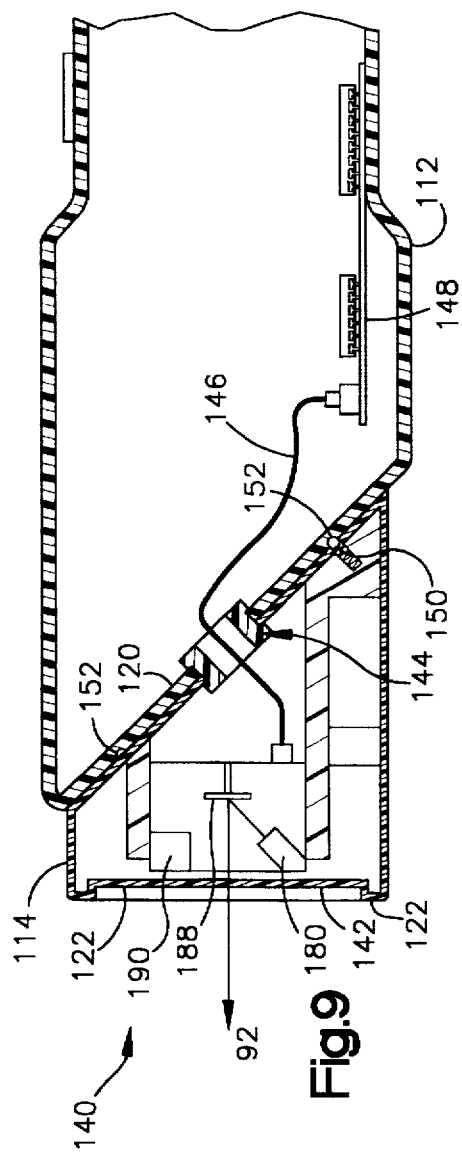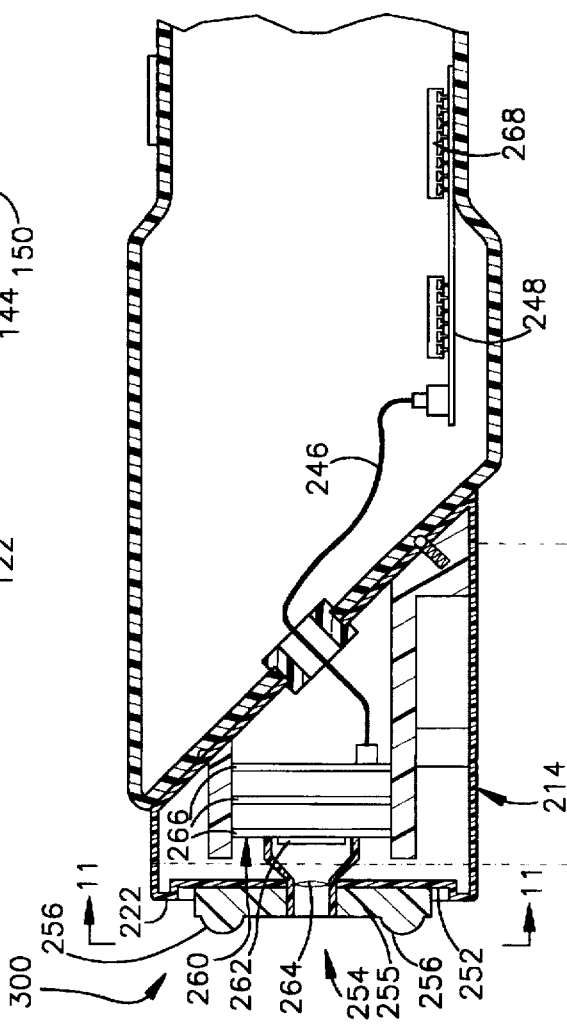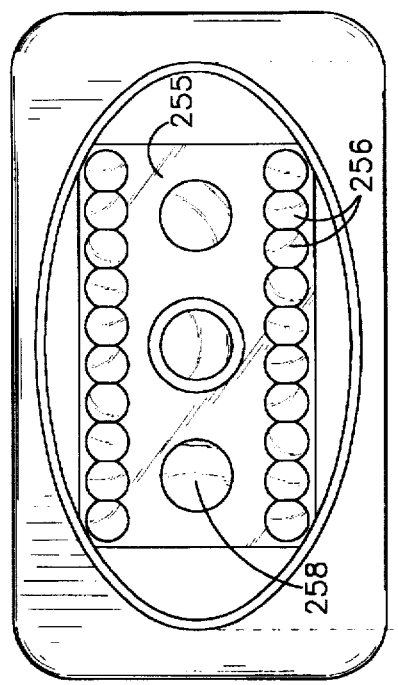

HAND HELD PORTABLE BAR CODE DATAFORM READER HAVING A ROTATABLE READER MODULE PORTION

FIELD OF INVENTION

This invention relates to a portable hand held bar code dataform reader and method for reading bar code dataforms and, more particularly, a portable hand held bar code dataform reader having a rotatable reader module portion allowing an operator to select an ergonomically correct bar code dataform reading orientation and a method of using the reader.

BACKGROUND

A typical portable dataform bar code reader includes a generally rectangular housing designed to be cradled in an operator's hand. A keyboard and display may be supported on a top face of the reader. The operator's free hand may be used to appropriately depress keys on the keyboard to enter data and/or actuate a laser scanner assembly to read a bar code dataform.

Typically, the laser scanner assembly is positioned in the dataform reader housing adjacent a scanning exit window. The exit window is normally positioned in a front face of the housing, the front face being perpendicular to the top face. When the reader is held, the front face of the housing faces away from the operator. Upon actuation of the laser scanner assembly, an oscillating scanning beam is generated and exits the housing through the exit window and travels along a scanning plane to intersect a target bar code dataform.

Light reflected from the scanned dataform returns through the exit window and is detected by a photosensitive component of the laser scanner assembly which converts the sensed light into electrical signals. A decoder electrically coupled to the photosensitive component converts the electrical signals into machine readable data corresponding to the data represented in the bar code dataform.

In a conventional bar code dataform reader configuration, the operator "points" the front face having the exit window at the bar code dataform to be read and actuates the laser scanner assembly. While this reader configuration is acceptable for "straight ahead" reading of vertically oriented bar code dataforms at heights between the operator's waist and eye level, it is ergonomically unacceptable for reading vertically oriented bar code dataform at heights above the operator's head. A conventional bar code reader configuration is also unsuitable for reading horizontally oriented bar code dataforms.

To read a horizontally oriented bar code with a conventional reader, the operator must angle the housing to a vertical position so that the front face is pointing toward the bar code dataform to be scanned. This results in an awkward, uncomfortable and fatiguing twisting of the operator's hand, wrist and/or arm. Furthermore, use of a conventional reader to read vertically oriented bar code dataforms above the operator's head is ergonomically difficult because the operator must orient the housing horizontally while holding the reader over his or her head. Again, this results in an unnatural and fatiguing twisting of the wrist.

To improve the ergonomics of reading horizontally oriented bar code dataforms and above the eye level elevated vertically oriented codes, some bar code readers have been designed with the front face tipping slightly downward. The problem associated with using a tip front face is that the reader becomes more difficult to use for reading mid and low level vertically positioned codes because the operator is forced to angle the housing to compensate for the angled face.

Therefore, there is a need to have a portable dataform reader configured to read bar code dataforms disposed at various orientations and heights including horizontally oriented bar code dataforms and vertical bar code dataforms disposed at heights above the operator's eye level without awkward and fatiguing twisting of the operator's hand, wrist and/or arm.

SUMMARY OF THE INVENTION

In accordance with this invention, a hand held bar code dataform reader is provided which includes a main housing and a scan module portion. The scan module portion is rotateably secured to the housing portion such that the scan module can be rotated to read vertically and horizontally oriented bar code dataforms. In one embodiment, the rotatable scan module is secured to the housing portion to read bar code dataforms to a front of a front face of the reader when in a first position and to read bar code dataforms below a bottom surface of the reader when the scan module is rotated to a second position.

For another embodiment of this invention, a scan module portion is rotateably secured to a main housing portion such that the scan module can be rotated to read bar code dataforms to a front of the reader when in a first position and to a side of the reader when the scan module is rotated to a second position.

In another aspect of this invention, a bar code dataform reader is provided with includes a main housing portion with a reader module portion secured to one end and a wand reader secured to the other end. Separate reader activation switches are provided to initiate a bar code dataform reading session. One reader activation switch is used to actuate reading with the reader module, while the other reader actuation switch is used to actuate reading with the wand. The switch associated with the wand is located on a housing portion near the wand. The switch associated with the reader module portion is located on a housing portion near the reader module portion.

The reader module portion may include a laser scanner engine with a laser and a photodetector. Alternatively, the reader module portion may include a two dimensional photosensor array image based reader.

One object of this invention is to provide a hand held bar code dataform reader having a rotatable reader module portion to facilitate reading bar code dataforms at various orientations and heights with respect to an operator.

These and other objects, advantages and features of the invention will become better understood from the detailed description of the preferred embodiment which is described in conjunction with the accompanying drawings.

BRIEF DESCRIPTION OF THE DRAWINGS

FIG. 1 is a side elevation view of a bar code dataform reader in accordance with the present invention;

FIG. 2 is a top plan view of the bar code dataform reader of FIG. 1 as seen from a plane indicated by line 2—2 in FIG. 1;

FIG. 3 is a front elevation view of the bar code dataform reader of FIG. 1 as seen from a plane indicated by line 3—3 in FIG. 2;

FIG. 9 is a sectional view of a laser scanner assembly disposed in a reader module portion of the bar-code dataform reader of FIG. 1;

FIG. 10 is a sectional view of an imaging sensor reader assembly disposed in a reader module portion of the bar code dataform reader of FIG. 1; and FIG. 11 is a front elevation view of the bar code dataform reader module portion of FIG. 10.

DETAILED DESCRIPTION

Figure 4:
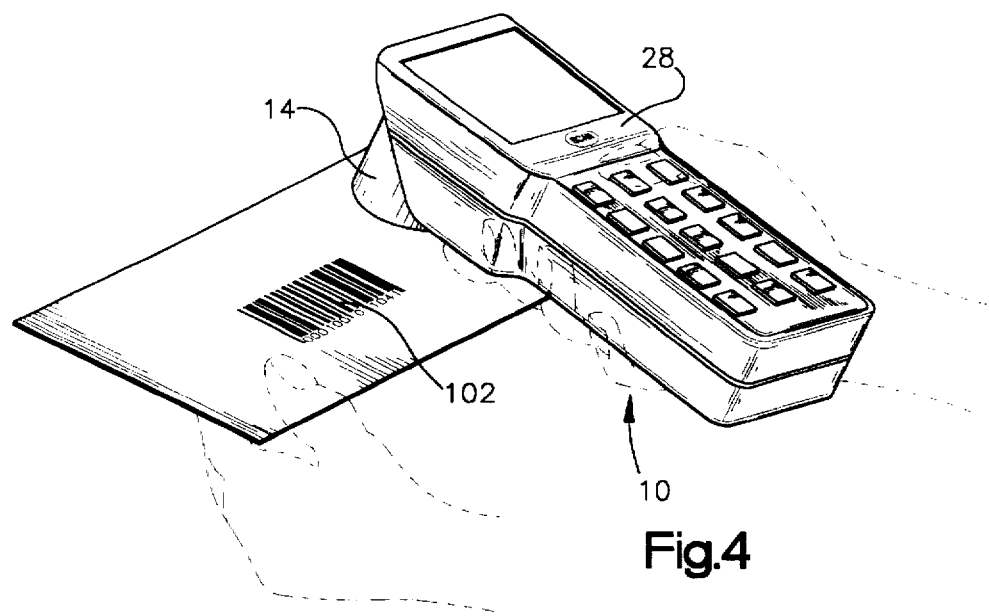
FIG. 4 illustrates use of the bar code dataform reader of FIG. 1 to read a horizontally oriented bar code dataform.
Figure 5:
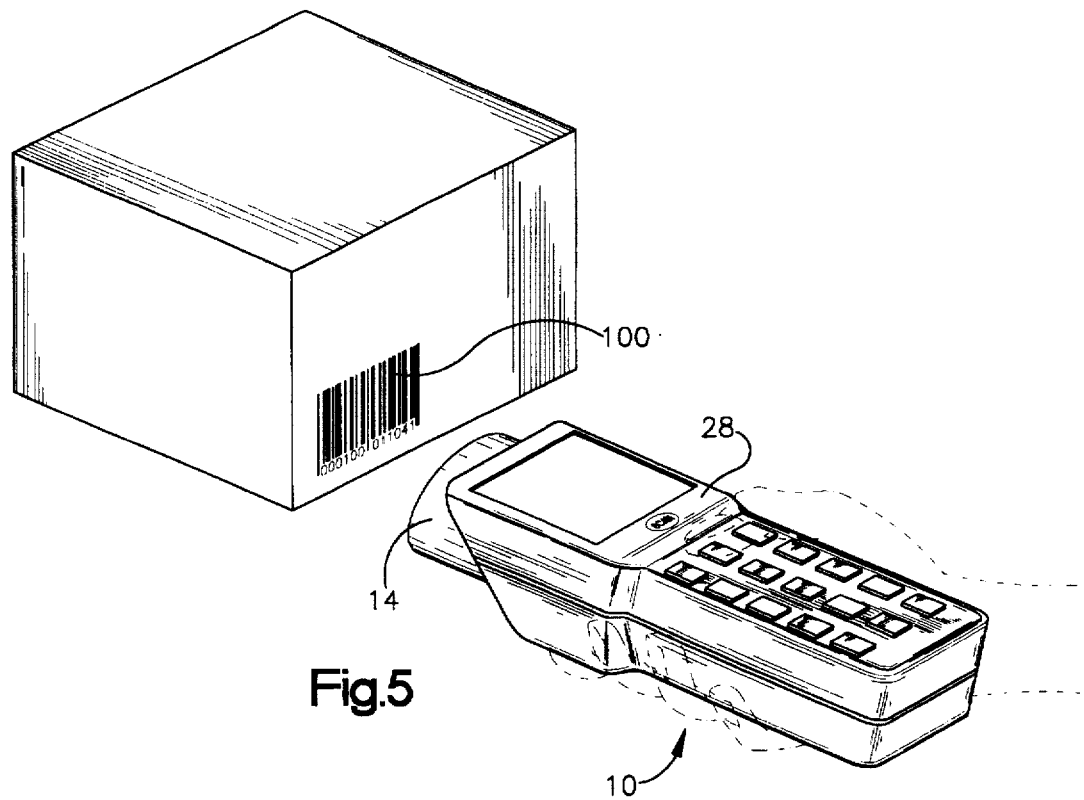
FIG. 5 illustrates use of a bar code dataform reader of FIG. 1 to read a vertically oriented bar code dataform.

Turning to the Figures, a bar code dataform reader of the present invention is shown generally at 10 in FIGS. 1–5. The bar code dataform reader 10 includes a main body portion 12 and a rotatably connected reader module portion 14. The main body portion 12 includes a generally rectangular top surface 28 and a generally rectangular bottom surface 70. As can be seen in FIGS. 4 and 5, an operator cradles the main body portion 12 in one hand (shown in dashed lines) such that the top surface 28 faces generally upwardly and can be viewed by the operator.

The top surface 28 and the bottom surface 70 are separated by a side wall comprising an inclined front surface 72 and a side surface 74. The reader module portion 14 is rotatably secured to the inclined front surface 72 of the main body portion 12. The reader module 14 rotates about an axis of rotation 18. The top surface 28 includes an upper portion 28a which is generally planar. The axis of rotation 18 of the reader module portion 14 intersects a plane defined by the upper portion 28a at an angle of between 30 degrees and 60 degrees with respect to vertical. Preferably, the angle of intersection is 45° with respect to vertical, as seen in FIG. 1.

In the position of the reader module portion 14 shown in FIG. 5 and shown in FIG. 1 in solid lines, the reader 10 is adapted for "straight ahead" reading of a bar code dataform 100 (FIG. 5). That is, reading a bar code dataform which is vertically oriented and at a height between the operator's waist and eye level. In FIGS. 1 and 3, a direction of bar code reading or field of view of the reader module portion 14 is represented by a direction 16.

In the position of the reader module portion 14 shown in FIG. 4 and shown in dashed lines in FIG. 1, the reader 10 is adapted for reading a bar code dataform 102 which is horizontally oriented (as seen in FIG. 4), that is, or a bar code dataform (not shown) which is vertically oriented but at a height above the operator's eye level. In FIGS. 1 and 3, a direction of bar code reading or field of view of the reader module portion 14 is represented by a direction 26 (in dashed line).

FIG. 2 is a top plan view of the dataform reader 10. The top surface 28 includes a display screen 3b supported in an aperture in the upper portion 28a. The operator, holding the dataform reader in the palm of his or her cupped hand views the display screen 30. A lower portion 28b of the top surface 28 includes a keypad having a plurality of key switches 34. The key switches 34 are operated by the free hand of the operator, that is, the hand not used to cradle the reader 10.

A reading session activation switch 36 is positioned in the center of the top surface 28. The operator may advantageously actuate the reader 10 read a bar code dataform by depressing the switch 36 with a thumb of a hand holding the reader 10. A longitudinal axis 19 extends through a center of a longer dimension of the top surface 28 (the vertical dimension in FIG. 2). The axis of rotation 18 intersects the longitudinal axis 19 at an acute angle of approximately 45 degrees.

FIG. 3 is a front elevation view of the dataform reader 10. The reader module 14 is shown directed towards a target area to the front of the dataform reader, that is, a bar code dataform which would be positioned above the plane of the page. In dashed lines in FIG. 3, the reader module portion 14 is directed to read a target area to the bottom of the reader, that is, below the bottom surface 70 of the reader 10.

FIGS. 4 and 5 illustrate use of the dataform reader 10 to scan a horizontally oriented bar code dataform 102 (FIG. 4) and a vertically oriented bar code dataform 100 (FIG. 5). FIG. 4 illustrates use of the dataform reader 10 for reading the bar code 102 positioned below the bottom surface 70 of the reader. The reader module portion 14 is rotated to a position perpendicular to the axis 19, that is, the reader module is turned towards a target area to the bottom of the main housing portion 12 to facilitate reading the bar code dataform 102.

FIG. 5 illustrates use of the dataform reader 10 for reading a bar code dataform 102 positioned on a vertical surface at or below the operator eye level. The reader module portion 12 is rotated to a position parallel to the axis 19, that is, the module portion is turned towards a target area to the front of the main housing. It should be apparent that attempting to read the horizontally oriented bar code 102 of FIG. 4 with the reader module 12 positioned to read to the front of the housing would be difficult and require awkward twisting of the operator's hand, wrist and/or arm.

By the same token, attempting to read a vertically oriented bar code at eye level height, or lower, with the reader module 12 positioned to read a target area to the bottom of the reader 10 (i.e., oriented perpendicular to the axis 19) would also be ergonomically difficult requiring awkward twisting of the operator's hand, wrist and/or arm.

Figure 6:
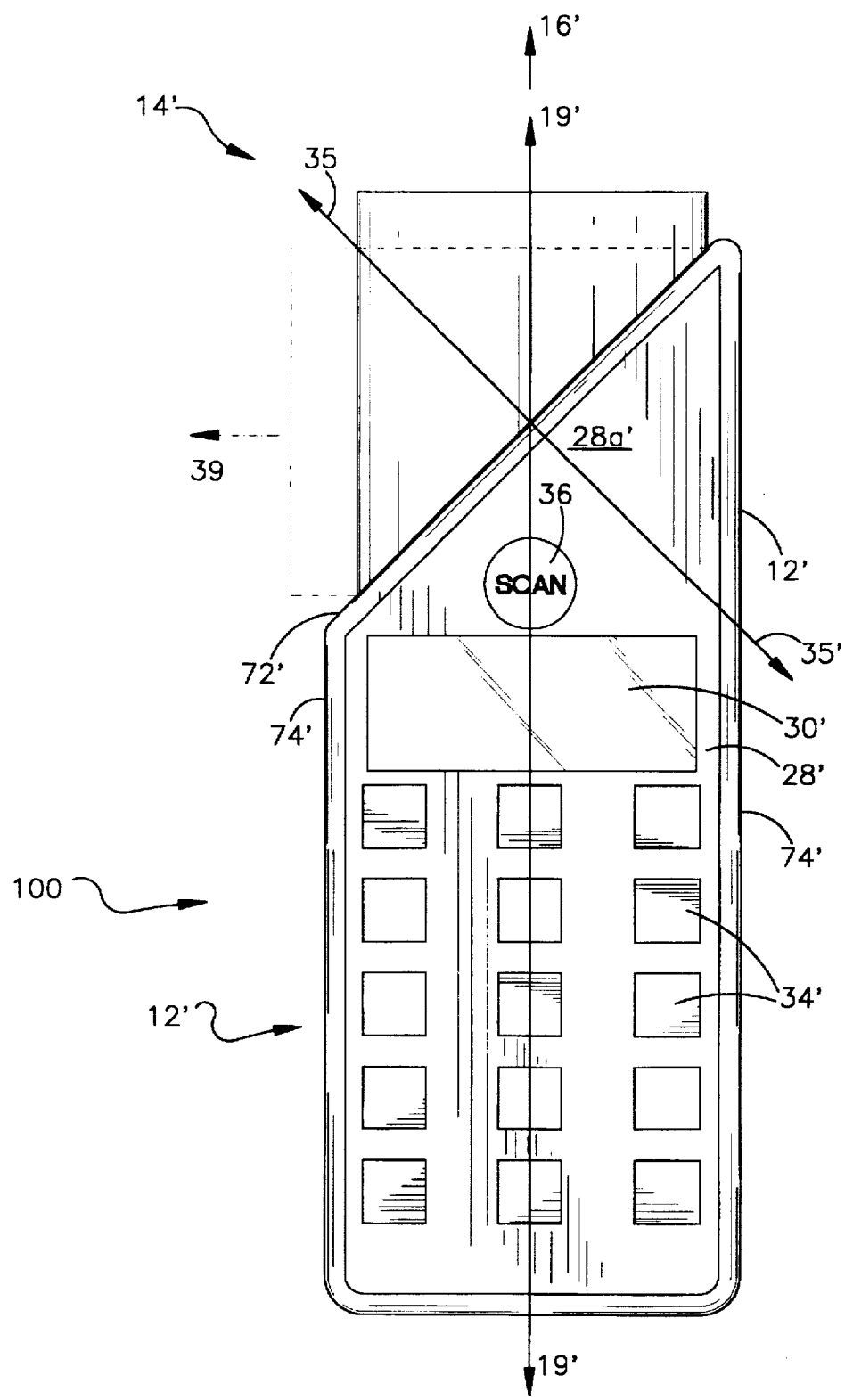
FIG. 6 is a top plan view of a second embodiment of a bar code dataform reader of the present invention.

FIG. 6 shows another embodiment of a portable bar code dataform reader 100 of the present invention. The components of the reader 100 are generally the same as the first embodiment 10 shown in FIG. 1–5 but a main housing portion 12' is configured differently than the housing 12 of the first embodiment to facilitate reading a bar code which is position to a side of the operator.

The reader 100 includes the main housing 12' and a rotatably connected reader module portion 14'. A top surface 28' and a bottom surface (not shown) are not rectangular (as in the first embodiment) but rather they are trapezoidal in shape. That is, an upper portion 28a' of the top surface 28' has general shape of an isosceles triangle. An upper portion (not shown) of the bottom surface has the same isosceles triangle shape. Therefore, a front surface 72' of the main housing 12' is angled with respect to a longitudinal axis 19' of the housing 12', that is, the front surface 72" is inclined. The reader module 14' is rotatably secured to the front surface and rotates about an axis of rotation 35. The axis 35 intersects the side surface 74' (or the extended plane defined by the side surface) at preferably 45 degrees. The axis 35 also intersects a longitudinal axis 19' of the top surface 28' at an angle of approximately 45 degrees. In a first position of the reader module 14' (shown in solid lines in FIG. 6), the module is directed to read along a direction or field of view 16', that is, toward a target area toward the front of the reader 100. In a second position of the reader module 14' (shown in dashed lines in FIG. 6), the module is directed to read along a direction or field of view 39, that is, toward a left side of the reader 100.

Figure 7:
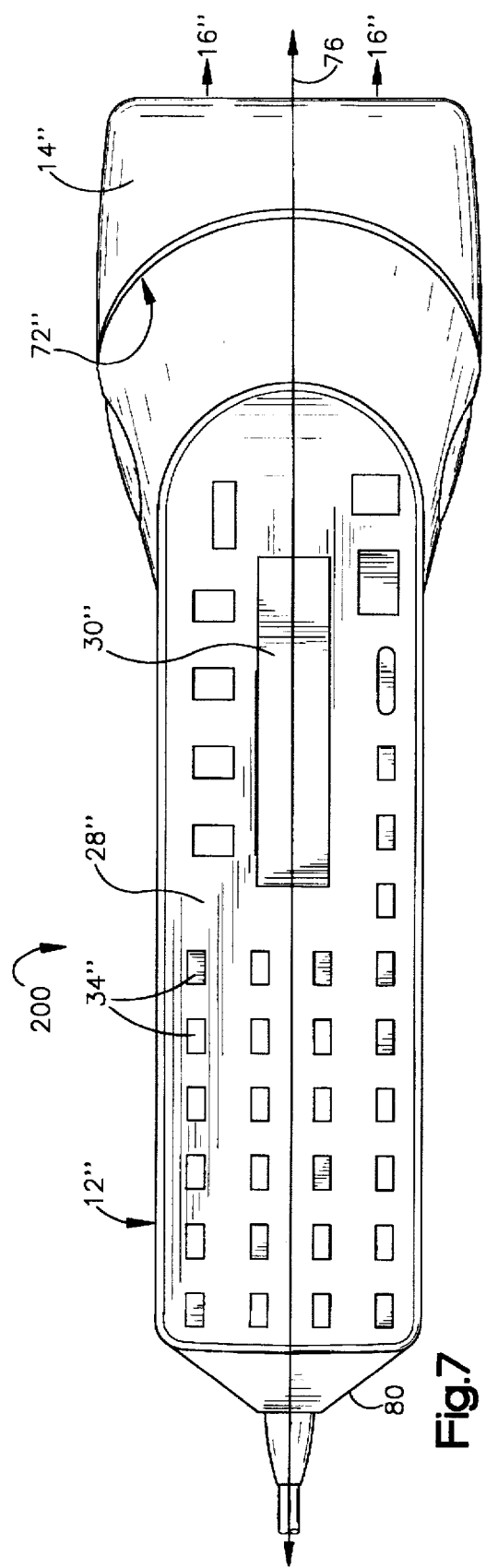
FIG. 7 is a top plan view of a third embodiment of a bar code dataform reader of the present invention.
Figure 8:
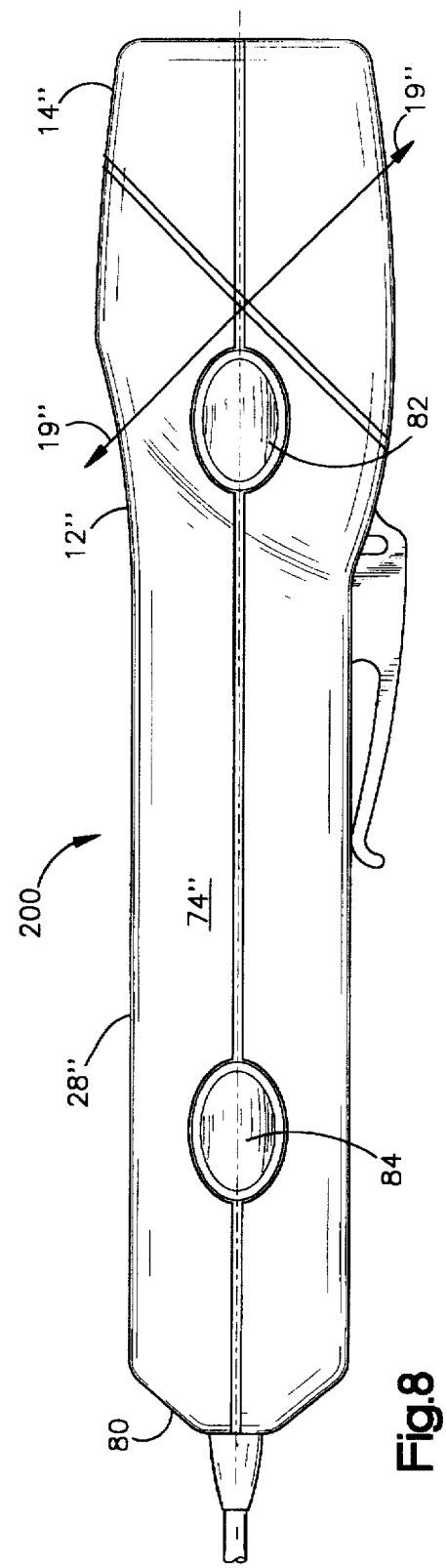
FIG. 8 is a side elevation view of the bar code dataform reader of FIG. 7.

FIGS. 7 and 8 illustrate a third embodiment of a bar code dataform reader 200 of the present invention. Referring to FIG. 7, which shows a top plan view of the reader 200, a reader module portion 14" is rotatably connected to a main housing portion 12". The main housing portion 12" includes a top surface 28" which is generally rectangular and planar. It includes a plurality of manually activated keyswitches 34" and a display screen 30" for user interaction with the dataform reader. The front surface 72" is generally elliptically shaped causing the angular intersection between the top surface 28" and the front surface to appear curved in the top plan view of FIG. 7.

The reader module portion 14" is shown rotated so that the target area is to a front of the reader, that is, reading of a bar code dataform (not shown) occurs along a direction or field of view 16". The module 14" can also be rotated (not shown) to scan to a side of the housing similar to the reader 100 of the second embodiment.

A wand bar code reader 80 is secured to the main housing 12" at an end opposite the reader module portion 14". The wand reader 80 preferably includes an LED illumination source and a photodiode for detecting the variable intensity of reflected illumination as the wand is moved over a bar code dataform (not shown). A suitable wand reader is commercially available from Welch Allyn Corporation of Skaneateles, N.Y.

FIG. 8 is a side view of the portable bar code dataform reader 200. A side 74" of the main housing portion 12" includes two manually activated switches 82 and 84 for initiating dataform reading sessions. The switch 84 is located nearer the wand reader 80 and is used to activate the wand reader. On the other hand, the switch 82 is located nearer the reader module 14" and is used to activate the reader module.

FIG. 9 is a sectional view of a laser scanning assembly, shown generally at 140. The laser scanning assembly 140 supported in any of the dataform reader module portions described above and a portion of the main housing of any of the three embodiments set forth above. FIG. 9 illustrates a laser scanning assembly 140 supported within a housing 114 of a bar code reader module. The laser reader module 140 is positioned within the bar code reader module housing proximate to an exit window 142. The exit window 142 is supported in an aperture of a front surface 122 of the bar code dataform reader module housing 114. The reader module reads bar codes dataforms along a direction or field of view 92.

The reader module portion housing 114 is secured to a main body portion 112 by a rotating pin mechanism 144. The rotating pin mechanism 144 includes an throughbore providing a passage for a ribbon cable 146 to connect the laser scanning assembly 140 to a decoder board 148 including decoder circuitry in the main body portion 112. The pin mechanism 144 may advantageously be a large diameter threaded fastener with an aperture in the center. To prevent the reader module housing 114 from freely spinning with respect to the main body portion 112, a spring biased roller mechanism 150 in the reader module housing engages spaced indentations 152 in the main body portion.

The laser scanning assembly includes a laser and optics, schematically shown at 180 for generating a beam of light directed towards a target area along the direction 92. An oscillating mirror 188 sweeps the beam back and forth across the target area defining a scanning plane along the direction 92. Alternatively, the laser may be mounted to an oscillating mechanism to cause the laser itself to oscillate thereby sweeping the beam back and forth across the target area. A photodiode 190 is positioned to detect the variable intensity of reflected illumination from the target area. Signal processing circuitry (not shown) operates to generate a signal representative of the variable intensity reflected illumination. Appropriate laser scanning assemblies include the model SE-1000 from Symbol Technologies of Bohemia New York or the model 5303 available from PSC Inc. of Webster, N.Y.

In place of the laser scanning assembly illustrated in FIG. 9, an image sensing array reader module, shown generally at 300 in FIGS. 10 and 11 may be utilized. FIG. 10 is a section view of the image sensing array reader module, while FIG. 11 is a front view. A front end 222 of the bar code reader module housing 114 includes a flat surface 252. An illumination module 254 is secured to the flat surface 252. The illumination module 254 includes a plurality of LED's (not shown) positioned behind a plurality of lens elements 256 integrally molded into a durable acrylic casing 255. The plurality of lenses 256 operate to direct an even field of high intensity illumination onto a target area (not shown). Targeting lens elements 258 (FIG. 11) operate to focus bright illumination spots on a bar code dataform (not shown) to be scanned to assist the operator in aiming the reader. A more detailed description of the illuminator module can be found in U.S. patent application Ser. No. 08/494,435 filed Jun. 26, 1995 and assigned to Metanetics Corporation, the entire contents of which is hereby incorporated by reference.

A camera assembly 260 is positioned within the reader module portion. The camera assembly includes a two dimensional photosensor array 262. A lens assembly 264 focuses an image of the target area onto the photosensor array 262. A more detailed description of the lens assembly 264 can be found in the above incorporated patent application.

Camera circuitry, shown on three printed circuit boards 266 operate to read out the image form the sensor array 262 and generate a gain controlled video signal which is transferred to a decoder board 248 by a ribbon cable 246. The decoder board 248 includes circuitry embodied in a microprocessor 268 for decoding the dataform along with controlling gain and exposure of the camera assembly. A more detailed description of the camera assembly and the decoder board may be found in U.S. patent application Ser. No. 08/507,607 filed Jul. 25, 1995 and assigned to Metanetics Corporation, the entire contents of which is hereby incorporated by reference.

The present invention has been described with a degree of particularity, it is the intent however, that the invention includes all modification and alterations from the disclosed design falling within the spirit or scope of the appended claims.

I claim:

1. A hand held dataform reader comprising:
    (a) a main body portion configured to be gripped in an operators hand, the main body portion including a top surface and a generally parallel bottom surface separated by an inclined front surface and a side surface, said front surface intersecting said top surface at an angle between 30 degrees and 60 degrees from perpendicular, and
    (b) a reader module portion mounted to said front surface and rotatable about an axis of rotation substantially perpendicular to said main body portion front surface.

said reader module portion including a dataform reader module for reading a target dataform in a target area, the reader module portion being rotated such that the dataform reader module is directed towards the target area, the reader module portion having an inclined surface which is complimentary to the inclined front surface of the main body portion such that when the reader module portion is rotated with respect to the main body portion, the reader module portion inclined surface and the main body portion inclined front surface move relative to each other in a single plane.

2. The hand held dataform reader of claim 1 wherein the top surface includes a keyboard and a display for user interaction with said reader.

3. The reader of claim 1 wherein the axis that the reader module intersects the top surface.

4. The reader of claim 1 wherein the top surface includes a manually actuating switch for initiating a dataform reading session.

5. The reader of claim 1 wherein the dataform reader module comprises a laser diode directed towards the target area and a photodetector for detecting the variable intensity of illumination from the target area and generating a signal representative thereof.

6. The reader of claim 1 wherein the reader module portion further comprises an illumination module positioned to direct a substantially even field of illumination towards the target area and the dataform reader module includes a two-dimensional photosensor array camera generating a video signal representative of the target area.

7. A hand held dataform reader comprising:
 (a) a generally rectangular main housing with a first end and a second end spaced apart by an elongated body portion,
 (b) a first dataform reader positioned on said first end,
 (c) a second dataform reader supported within a second dataform reader portion rotatable mounted to said second end, and
 (d) a first manually activated switch for initiating a bar code reading session by the first dataform reader and a second manually activated switch for initiating a dataform reading session by the second dataform reader.

8. The dataform reader of claim 7 wherein the first dataform reader is a bar code reading wand.

9. The dataform reader of claim 8 wherein the second dataform reader is a laser scanner bar code reader comprising a laser diode directed towards a target area and a photodetector for detecting the variable intensity of illumination from the target area and generating a signal representative thereof.

10. The dataform reader of claim 9 wherein said first switch is positioned closer to said wand bar code reader and said second switch is positioned closer to said reader module.

11. The dataform reader of claim 8 wherein the second dataform reader is an imaging sensor reader comprising an illumination module positioned to direct a substantially even field of illumination towards a target area and a two-dimensional sensor array camera generating a video signal representative of the target area.

12. The dataform reader of claim 11 wherein said first switch is positioned closer to said wand bar code reader and said second switch is positioned closer to said reader module.

13. A method of reading a target dataform using a dataform reader having a generally rectangular main housing with spaced apart ends separated by an elongated body portion and having a first dataform reading module positioned at a first end of the main housing and a second dataform reader module supported in a second dataform reader module portion that is rotatably mounted to a second end the main housing, the housing supporting a first manually activated switch for activating the first dataform reader module to read a dataform and a second manually activated switch for activating the second dataform reading module to read a dataform, said method comprising:
 (a) selecting one of the first dataform reader module and the second dataform reader module to read the target dataform,
 (b) positioning the main housing such that the target dataform is within a field of view of the the first dataform reader module if the first dataform reader module was selected to read the target dataform,
 (c) rotating the second dataform reader module portion with respect to the main housing and positioning the main housing such that the target dataform is within a field of view of the second dataform reader module if the second dataform reader module was selected to read the target dataform,
 (d) depressing the first switch to activate the first dataform reader module if the first dataform reader module was selected to read the target dataform, and
 (e) depressing the second switch to activate the second dataform reading module if the second dataform reading module was selected to read the target dataform.

14. A hand held dataform reader comprising:
 (a) a main body portion configured to be gripped in an operators hand, the main body portion including a top surface and a generally parallel bottom surface separated by an inclined front surface and a side surface, said front surface intersecting said side surface at an angle between 30 degrees and 60 degrees from perpendicular, and
 (b) a reader module portion mounted to said front surface and rotatable about an axis of rotation substantially perpendicular to said inclined front surface of the main body portion, said reader module portion including a dataform reader module for reading a target dataform in a target area, the reader module portion being rotated such that the dataform reader module is directed towards the target area, the reader module portion having an inclined surface which is complimentary to the inclined front surface of the main body portion such that when the reader module portion is rotated with respect to the main body portion, the reader module portion inclined surface and the main body portion inclined front surface move relative to each other in a single plane.

15. The hand held dataform reader of claim 14 wherein the top surface includes a keyboard and a display for user interaction with said reader.

16. The reader of claim 14 wherein the axis that the reader module intersects the side surface.

17. The reader of claim 14 wherein the top surface includes a manually actuating switch for initiating a dataform reading session.

18. The reader of claim 14 wherein the dataform reader module comprises a laser diode directed towards the target area and a photodetector for detecting the variable intensity of illumination from the target area and generating a signal representative thereof.

19. The reader of claim 14 wherein the reader module portion further comprises an illumination module positioned to direct a substantially even field of illumination towards the target area and the dataform reader module includes a two-dimensional photosensor array camera generating a video signal representative of the target area.

* * * * *